L. A. NUCERA.
RESILIENT WHEEL.
APPLICATION FILED JULY 25, 1919.
1,388,820.
Patented Aug. 23, 1921.
2 SHEETS—SHEET 1.
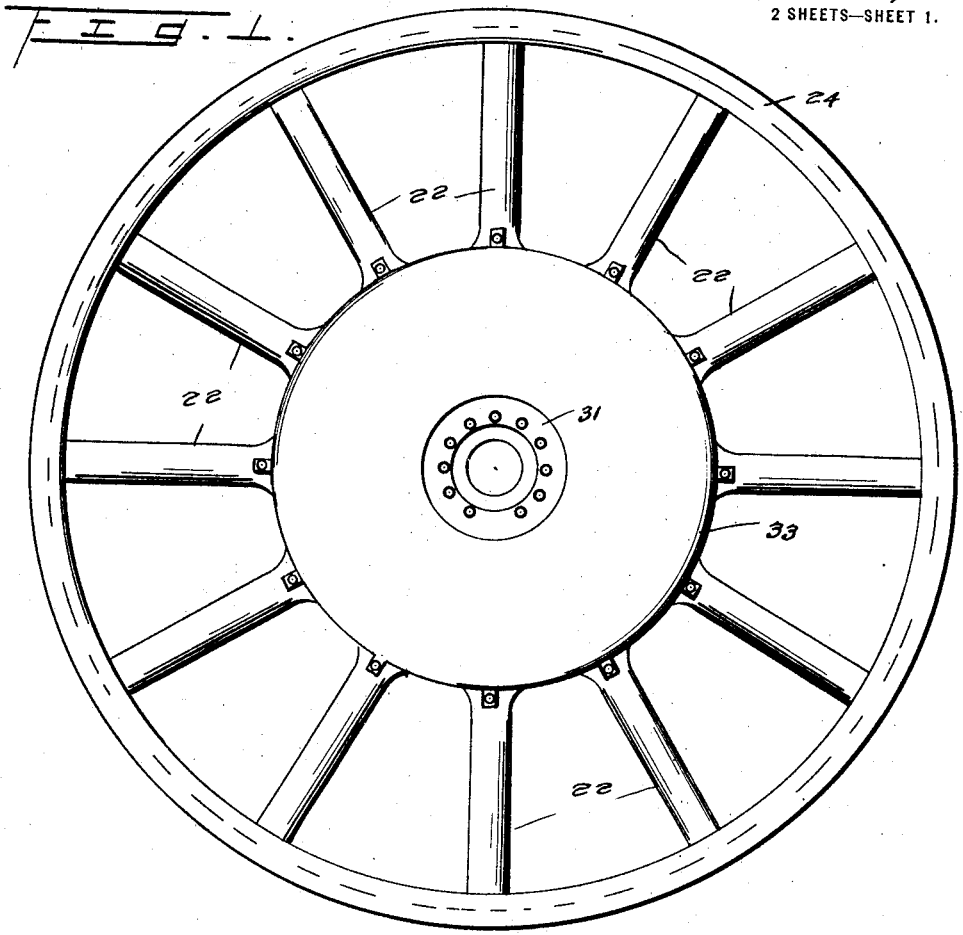
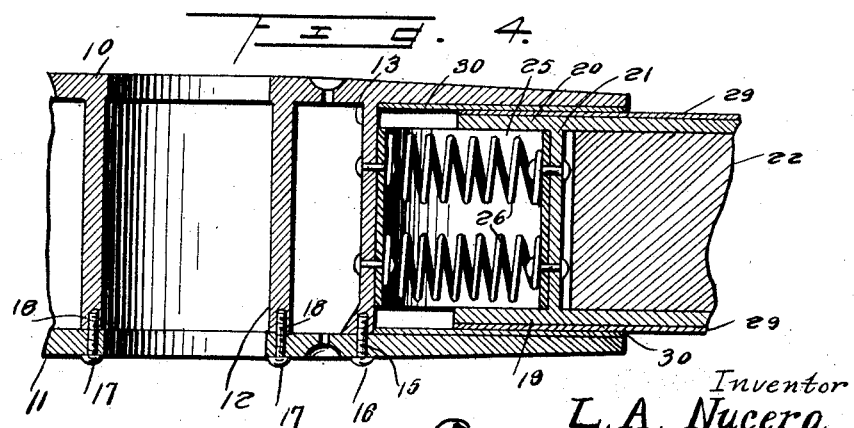
Inventor
L. A. Nucera.
By
Attorney L. A. NUCERA.
RESILIENT WHEEL.
APPLICATION FILED JULY 25, 1919.
1,388,820.
Patented Aug. 23, 1921.
2 SHEETS—SHEET 2.
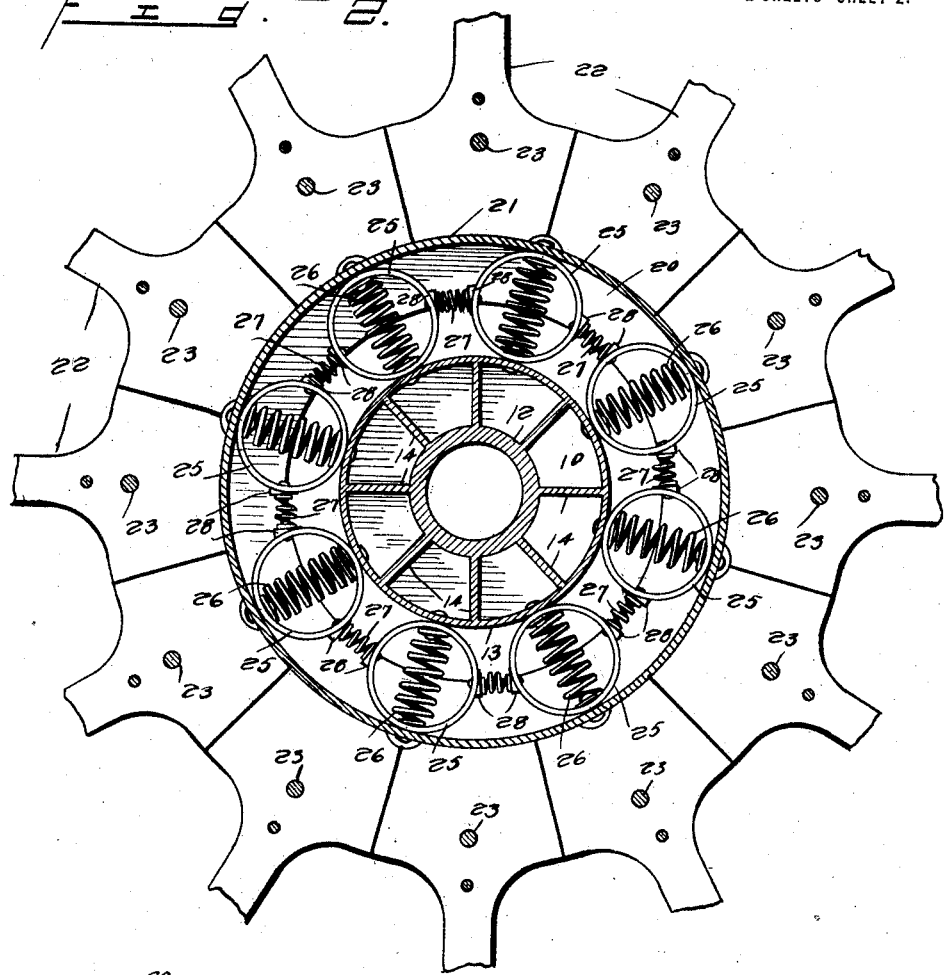
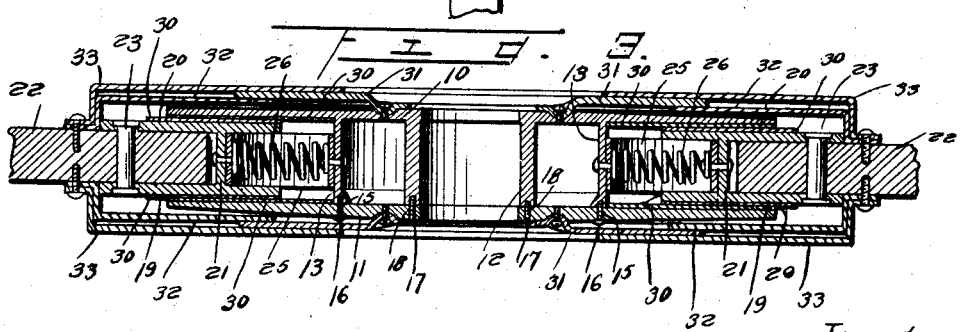
Inventor.
L. A. Nucera.
By
Attorney.

UNITED STATES PATENT OFFICE.

LEWIS A. NUCERA, OF BUFFALO, NEW YORK.

RESILIENT WHEEL.

1,388,820.

Specification of Letters Patent.  Patented Aug. 23, 1921.

Application filed July 25, 1919. Serial No. 313,277.

*To all whom it may concern:*

Be it known that I, LEWIS A. NUCERA, a citizen of the United States, residing at Buffalo, in the county of Erie and State of New York, have invented certain new and useful Improvements in Resilient Wheels; and I do hereby declare the following to be a full, clear, and exact description of the invention, such as will enable others skilled in the art to which it appertains to make and use the same.

This invention relates to an improved resilient wheel, and the principal object of the invention is to provide a wheel having an improved hub construction with which the spokes will be connected and which will include an improved spring construction yieldably holding the spoke carrying rim spaced from the hub proper and permitting this spoke carrying rim to have necessary movement to take up shocks received when passing over rough roads. Another object of the invention is to so construct the wheel that the spring construction thereof will be very strong and durable and not liable to easily break or move out of the proper position. Another object of this invention is to so construct the hub portion of the wheel that the spring construction thereof will be inclosed and the springs thus preserved against exposure to weather and injury from dirt and mud and to further so construct this hub that it may be easily assembled or taken apart when necessary for cleaning or repairing.

This invention is illustrated in the accompanying drawings wherein:

Figure 1 is a side elevation of the improved wheel,

Fig. 2 is a view showing the improved wheel in vertical section,

Fig. 3 is a transverse sectional view through the wheel,

Fig. 4 is a transverse sectional view through the hub portion of the wheel disclosing a slightly modified construction.

This wheel is provided with a hub having side plates 10 and 11 which are extended parallel in spaced relation and are held in spaced relation by circular webs 12 and 13 which extend from the side plate 10, as shown in Fig. 3, and are connected at points about the circumference of the hub structure by the radial ribs 14 and 15. At the junction of the radial ribs and circular web 13 there has been provided threaded openings 15ᵃ which receive the screws 16. These screws 16, together with the screws 17 which fit into sockets 18 in the annular web 12, serve to releasably hold the side plates 11 in place thus permitting the removal of the side plates 11 when it is desired to have access to the interior of the hub structure.

The inner spoke carrying rim is of a channel construction and is provided with side walls 19 and 20 connected by an annular web 21 upon which the inner ends of the spokes 22 will rest. These spokes 22 are provided with enlarged heads at their inner ends which contact and completely fill the spoke carrying rim thereby preventing circumferential movement of the spokes when the spokes are in place and secured by the bolts or other fasteners 23. These spokes extend outwardly in radiating relation from the hub and have their outer ends suitably connected with the felly or rim 24 upon which the tire will be placed. As the resiliency is provided in the hub in a manner to be hereinafter pointed out, this tire may be of solid rubber or other composition and will therefore not be subject to puncture. It will thus be seen that this wheel from the inner spoke carrying rim to the outer tire carrying rim will be a firm and rigid structure not liable to be damaged.

In order to provide the necessary resiliency there has been provided within the hub and between the web 13 and the web 21 of the spoke carrying rim circular springs 25 which are positioned as clearly shown in Fig. 2 and secured by rivets or other fasteners to the webs 13 and 21. These springs 25 are braced interiorly by spiral springs 26 which extend diametrically of the springs 25 and radially of the wheel and thus serve to greatly strengthen the springs and permit them to absorb heavy shocks in going over rough roads without danger of the springs 25 being broken. From an inspection of Figs. 3 and 4 it will be readily seen that each of these springs 25 may be provided either with one spring 26 or with a plurality of these springs according to the size of the wheel and type of car upon which the wheel is to be used. Spiral springs 27 are positioned between the springs 25 and are provided with terminal blocks 28 engaging the springs 25 and conforming to the contour thereof thus preventing the springs 27 from being bent and twisted out of shape when the wheel is in use. These springs coöperate with the springs 25 and 26 in taking up shocks received in going over rough roads and further serve to brace the springs 25 and give them greater resiliency. In order to protect the inner spoke carrying rim and the inner faces of the side plates 10 and 11 from undue wear when the wheel is in use, there have been provided bushings 29 and 30 which are secured to the spoke carrying rims and hub plates, respectively, and can be easily removed and renewed when necessary. Therefore, the bushings will receive the wear instead of the spoke rim and hub plate and it will not be necessary to renew the hub plate or spoke carrying rim in order to eliminate side play of the spoke carrying rim. These springs should be protected from exposure to weather as much as possible and in order to accomplish this object and not only keep snow and water out of the hub as much as possible but also to prevent mud from adhering to the bushings 29 there have been provided annular plates 31 which are secured to the hub plates and extend between the inner and outer plates 32 and 33 secured to the side walls of the spoke rims. These inner and outer plates 32 and 33 will be held in spaced relation by spacers 34 and therefore the plates 31 may have free movement between the plates 32 and 33. As previously stated, these plates serve as baffles covering the overlapping portions of the spoke carrying rims and side plates of the hub thus preventing mud and snow from accumulating upon this portion of the wheel.

This wheel will be assembled as clearly shown in Figs. 2 and 3 of the drawings and when in use will provide a resilient wheel in which the springs 25, 26 and 27 will effectively take up all shocks received in going over rough roads. The springs will coöperate in taking up the shocks and the springs 26 and 27 will serve to prevent the springs 25 from being bent out of the desired shape. When it is desired to make any necessary repairs to the hub or to clean and lubricate the same, this can be easily done by removing the baffle plate at one side of the hub and then remove the screws 16 and 17 thus releasing the side wall 11 of the hub. The interior of the hub will then be exposed to view and any necessary work can be easily done. I have thus provided a wheel which will be very strong and durable and simple in construction and operation.

What is claimed is:

1. A resilient wheel comprising a hub structure having side plates, annular webs extending from one of the side plates to the second plate to hold the plates in spaced relation, radiating webs extending between the annular webs, means releasably connecting the second side plate with the annular webs, a spoke carrying rim positioned between the side plates of the hub structure and having side walls and an annular web connecting said walls, and springs positioned between the annular web of the spoke carrying rim and one of the annular webs of the hub structure and connected therewith.

2. A resilient wheel comprising a hub structure having side plates, main circular springs located between the side plates of said hub structure, a spoke carrying rim having side walls and an annular web, said main springs being connected with said annular web of the rim and with the hub structure, the side plates of the rim being positioned outwardly of and working over said side plates of the hub structure, reinforcing springs secured in the circular springs and extended radially of the wheel, and circumferentially extended reinforcing springs connecting the circular springs and extended between the latter.

In testimony whereof I affix my signature in presence of two witnesses.

LEWIS A. NUCERA.

Witnesses:
FRED L. ELTON,
WILLIAM M. YOUNG.